US007719132B2

(12) United States Patent
Hatten et al.

(10) Patent No.: US 7,719,132 B2
(45) Date of Patent: May 18, 2010

(54) RUGGEDIZED MOBILE COMPUTING DEVICE

(75) Inventors: Tony D. Hatten, Decatur, GA (US); James R. Pierce, Cumming, GA (US); Eric H. Walker, Suwanee, GA (US)

(73) Assignee: L3 Communications Corporation, New York, NY (US)

( * ) Notice: Subject to any disclaimer, the term of this patent is extended or adjusted under 35 U.S.C. 154(b) by 891 days.

(21) Appl. No.: 11/535,756

(22) Filed: Sep. 27, 2006

(65) Prior Publication Data

US 2007/0069913 A1  Mar. 29, 2007

Related U.S. Application Data

(60) Provisional application No. 60/721,511, filed on Sep. 28, 2005, provisional application No. 60/721,370, filed on Sep. 28, 2005.

(51) Int. Cl.
*B60L 1/00* (2006.01)
(52) U.S. Cl. ....................................................... 307/9.1
(58) Field of Classification Search ................. 307/9.1, 307/10.1; 316/679.02, 679.26
See application file for complete search history.

(56) References Cited

U.S. PATENT DOCUMENTS

| | | | | |
|---|---|---|---|---|
| 4,409,641 A | * | 10/1983 | Jakob et al. | ................. 361/720 |
| 4,733,838 A | * | 3/1988 | van der Lely | ............ 248/124.1 |
| 4,747,040 A | | 5/1988 | Blanset et al. | |
| 4,946,120 A | | 8/1990 | Hatcher | |
| 5,272,747 A | * | 12/1993 | Meads | ........................ 455/407 |
| 5,278,973 A | | 1/1994 | O'Brien et al. | |
| 5,301,334 A | | 4/1994 | Horiuchi | |
| 5,430,883 A | | 7/1995 | Horiuchi | |
| 5,555,491 A | | 9/1996 | Tao | |
| 5,592,366 A | | 1/1997 | Goldman et al. | |
| 5,632,462 A | | 5/1997 | Kallas | |
| 5,673,628 A | | 10/1997 | Boos | |
| 5,689,406 A | | 11/1997 | Wood et al. | |
| 5,751,548 A | | 5/1998 | Hall et al. | |
| 5,794,164 A | * | 8/1998 | Beckert et al. | ............. 455/3.06 |
| 5,859,628 A | * | 1/1999 | Ross et al. | ................... 345/173 |
| 5,859,762 A | | 1/1999 | Clark et al. | |
| 5,931,929 A | | 8/1999 | Tran et al. | |
| 6,005,368 A | | 12/1999 | Frame | |
| 6,113,047 A | | 9/2000 | Wung et al. | |
| 6,119,184 A | | 9/2000 | Takahama | |

(Continued)

*Primary Examiner*—Albert W Paladini
(74) *Attorney, Agent, or Firm*—Gardner Groff Greenwald & Villanueva, PC (57) ABSTRACT

A ruggedized mobile computing system for a motor vehicle includes a ruggedized mobile computing device, which can be mounted in the trunk or other convenient location, and a suitable user interface system, such as a display screen, keyboard, etc., mounted in the vehicle cabin. The computing device can accommodate user-removable, plug-in electronic modules that perform specialized processing, communications, control or other specialized tasks relating in some way to the vehicle mission or purpose. The device has a ruggedized enclosure made of a durable material such as sheet metal or high-impact plastic. The enclosure can include a guard that protects cables extending from the front panel from being damaged or inadvertently removed. Cooling and warming systems can be included that maintain the enclosure environment within suitable operating temperatures in hot or cold weather. Some or all of the electronic or electromechanical elements, such as a disk drive, can be mounted with isolation mounts that protect them against harmful effects of mechanical shock and vibration.

20 Claims, 6 Drawing Sheets

U.S. PATENT DOCUMENTS

| | | | |
|---|---|---|---|
| 6,119,237 | A | 9/2000 | Cho |
| 6,213,438 | B1 | 4/2001 | Ostby et al. |
| 6,330,669 | B1 | 12/2001 | McKeeth |
| 6,381,133 | B1 | 4/2002 | Chen |
| 6,386,413 | B1 | 5/2002 | Twyford |
| 6,411,884 | B1 | 6/2002 | Chutorash |
| 6,518,881 | B2 | 2/2003 | Monroe |
| 6,585,201 | B1 | 7/2003 | Reed |
| 6,605,924 | B2 | 8/2003 | Tanaka et al. |
| 6,674,637 | B2 | 1/2004 | Shin et al. |
| 6,697,972 | B1 | 2/2004 | Oshima et al. |
| 6,711,605 | B2 | 3/2004 | Sekiguchi et al. |
| 6,715,016 | B1 | 3/2004 | Ohno et al. |
| 6,727,920 | B1 | 4/2004 | Vineyard, Jr. et al. |
| 6,742,070 | B2 | 5/2004 | Fuchida |
| 6,768,652 | B2 | 7/2004 | DeLuga |
| 6,813,145 | B2 | 11/2004 | DeLuga |
| 6,833,989 | B2 | 12/2004 | Helot et al. |
| 6,892,261 | B2 | 5/2005 | Ohno et al. |
| 6,898,076 | B2 | 5/2005 | Pappalardo et al. |
| 6,917,989 | B1 | 7/2005 | Inoue |
| 6,928,542 | B2 | 8/2005 | Wen et al. |
| 6,961,870 | B2 | 11/2005 | Chiu et al. |
| 6,996,828 | B1 | 2/2006 | Kimura et al. |
| 7,068,503 | B2 | 6/2006 | Kamimaki et al. |
| 7,120,030 | B2 * | 10/2006 | Azumi et al. ............... 361/752 |
| 2001/0018717 | A1 | 8/2001 | Shimotono |
| 2002/0143844 | A1 | 10/2002 | Tsai |
| 2003/0114941 | A1 | 6/2003 | Bass et al. |
| 2003/0177276 | A1 | 9/2003 | Chiu et al. |
| 2003/0198015 | A1 | 10/2003 | Vogt |
| 2004/0066620 | A1 | 4/2004 | Grunow et al. |
| 2004/0088465 | A1 | 5/2004 | Bianchi |
| 2004/0090742 | A1 | 5/2004 | Son et al. |
| 2004/0150944 | A1 | 8/2004 | Byrne et al. |
| 2004/0205755 | A1 | 10/2004 | Lescouet et al. |
| 2004/0210848 | A1 | 10/2004 | Vineyard, Jr. et al. |
| 2005/0047079 | A1 | 3/2005 | Gasbarro et al. |
| 2005/0047081 | A1 | 3/2005 | LaPorte et al. |
| 2005/0060467 | A1 | 3/2005 | Wieck |
| 2005/0111181 | A1 | 5/2005 | Schlesner et al. |
| 2005/0111182 | A1 | 5/2005 | Lin et al. |
| 2005/0149933 | A1 | 7/2005 | Saito et al. |
| 2005/0273663 | A1 | 12/2005 | Yoon |
| 2006/0061964 | A1 | 3/2006 | Cheng |
| 2006/0085584 | A1 | 4/2006 | Chen et al. |
| 2006/0092605 | A1 | 5/2006 | DeLuga et al. |
| 2006/0133362 | A1 | 6/2006 | Stein et al. |
| 2006/0143354 | A1 | 6/2006 | Tsai et al. |
| 2006/0161713 | A1 | 7/2006 | Belady |

* cited by examiner

RUGGEDIZED MOBILE COMPUTING DEVICE

CROSS-REFERENCE TO RELATED APPLICATIONS

The benefit of the filing dates of U.S. Provisional Patent Application Ser. No. 60/721,511, filed Sep. 28, 2005, entitled MOBILE COMPUTER DOCKING STATION SYSTEM, and U.S. Provisional Patent Application Ser. No. 60/721,370, filed Sep. 28, 2005, entitled RUGGEDIZED MOBILE COMPUTER ENCLOSURE, are hereby claimed, and the specifications thereof are incorporated herein in their entireties by this reference. Co-pending U.S. patent application Ser. No. 11/535,746, filed Sep. 27, 2006, entitled "MOBILE COMPUTING DEVICE WITH MODULAR EXPANSION FEATURES," is related by subject matter.

BACKGROUND OF THE INVENTION

1. Field of the Invention

The present invention relates generally to computing systems and, more specifically, to a computing device for mobile environments, such as in a motor vehicle.

2. Description of the Related Art

Police cars and other emergency vehicles are becoming increasingly technologically sophisticated. Whereas there was a time when the only electronic systems related to emergency functions were warning lights, sirens and radios, today's police cars commonly have a variety of sophisticated digital communication and information processing systems.

In recent years, for example, it has become common for laptop computers to be used in police cars and other emergency vehicles. The laptop typically is mounted on a bracket or similar mounting in an orientation that allows the driver to use the keyboard and view the screen. The laptop computer is commonly able to communicate with law enforcement agency computers via a wireless (radio) data link. A police officer can enter a search query into the laptop to run a check on an automobile license number or determine if a person being detained for questioning is wanted by any law enforcement agencies. It is desirable for such a laptop to be of the "ruggedized" variety, but such is not always feasible due to the substantially greater cost of a ruggedized laptop as compared with a standard consumer-grade laptop. Indeed, a ruggedized laptop can cost five times as much as a regular, consumer-grade version. "Ruggedized" is a well-understood term of art that is generally applied to an electronic device that resists damage due to harsh environmental conditions or abuse, such as impact, vibration and shock, dust and dirt, moisture and liquid spills, and extreme heat and cold. The harsh environment of a police vehicle or other emergency vehicle can subject an ordinary laptop computer to some or all of the above-listed conditions, causing it to fail. The keyboard and screen are particularly sensitive to damage. An example of a ruggedized laptop computer is the TOUGHBOOK® line of laptops produced by Panasonic Corporation.

Emergency vehicle electronics are not limited to laptop computers. Some police cars also include global positioning satellite (GPS) systems for navigation or location purposes. Such systems can help guide the police officer to a location input by a dispatcher and received in the police car via the wireless data link. The GPS receiver and associated electronics are generally mounted in the vehicle trunk and connected with the laptop or other input/output device by cabling.

A video recording system is another increasingly common electronic device or system used in police cars. A camera mounted in the car feeds a video signal to a recording device. Although some newer systems may record video in digital format directly onto a laptop computer hard disk, more commonly the recording device is a videotape recorder or digital recorder mounted in the trunk of the vehicle.

With a video recorder, GPS receiver, controllers for sirens and warning lights, and so forth, all mounted in the vehicle trunk, the jumble of cabling that connects these devices with the vehicle systems to which they relate or to a laptop computer or dashboard controls, can prove to be a nightmarish mess for technicians charged with installing and maintaining such electronics. Moreover, as these devices are typically independent of one another without any integration among them, there are typically a number of cables carrying power, a number of cables carrying digital information, a number of cables carrying analog signals, etc., running between the trunk and other areas of the vehicle. Similarly, as a police department upgrades its vehicles with additional devices, space must be found for them in the trunk, and other devices and their cabling may need to be relocated. It has been said that with all of the electronics packed into a modern police car trunk, there is hardly room left anymore for a spare tire.

Also, as such devices become more technologically sophisticated, they increasingly include microprocessors, GPS receivers, Ethernet cards, and other such common computing and communication elements. It is not unknown for the trunk of a police car to contain a number of specialized devices made by different manufacturers, each with its own enclosure, power supply, microprocessor or similar controller, GPS receiver, own network card, etc. This duplication of electronics and cabling is very inefficient (especially in terms of power consumption), and the array of cabling and disparate devices makes maintenance difficult.

Furthermore, as police cars used by large metropolitan police forces are known to have useful lives that average about 18 months, maintenance personnel find themselves somewhat frequently having to remove some or all of the specialized electronics from a police car and install it in another.

Accordingly, there is a need for a mobile computing device that can withstand the rigors of the emergency response vehicle environment and that can be readily installed, removed and expanded. The present invention addresses these problems and deficiencies and others in the manner described below.

SUMMARY OF THE INVENTION

The present invention relates to a ruggedized mobile computing system for a motor vehicle, such as a police car, fire truck, emergency medical services vehicle, hazardous materials response vehicle, or other government or commercial vehicle that is regularly subjected to hard use or use in a harsh environment.

The computing system comprises a ruggedized mobile computing device, which can be mounted in a convenient location in the vehicle, such as the trunk. In some embodiments of the invention, the invention can completely eliminate the need for a separate laptop computer in the vehicle passenger compartment. The device has a ruggedized enclosure made of a durable material such as sheet metal or high-impact plastic. The enclosure can include a material that provides shielding against radio frequency interference (RFI) and electromagnetic interference (EMI) that could adversely affect the operation of electronic circuits. The enclosure can have latches, clips or other manually operable mounting means that allow maintenance personnel to easily install and remove it without tools or with minimal use of tools.

The enclosure can also include a guard that protects cables extending from the front panel from being damaged or inadvertently removed. For convenience of installation and maintenance in a vehicle trunk, all cables to and from the device can connect to the front of the enclosure.

The environment in the enclosure can be controlled to minimize potentially adverse effects of very high or very low ambient temperatures. A plurality of fans can be included to aid air flow through the enclosure and thereby cool the electronic components. Fan control logic can sense the ambient temperature in the enclosure and turn off the fans if the temperature is below a predetermined threshold. A filter can also be included to remove dust and similar contaminants from the air drawn by the fans through the enclosure. Logic can be provided to sense air flow through the enclosure and generate an indication to the user to service the filter if air flow drops below a predetermined threshold. In embodiments that include a disk drive or other electromechanical device that can be adversely affected by very low ambient temperatures, a warming system can be included that activates when the sensed ambient temperature in the enclosure is below a predetermined threshold.

The computing system can further comprise a suitable user interface system, such as a display screen, keyboard, mouse, etc., mounted in a location accessible to the vehicle driver or driver's assistant and connected to the computing device via a suitable cable or wireless communication link. The computing device can accommodate user-removable, plug-in electronic modules that perform specialized processing, communications, control or other specialized tasks relating in some way to the vehicle mission or purpose. For example, electronic modules for radio communication, location tracking, and control of beacon lights and sirens can be included. The electronic modules enhance expandability, as personnel can begin using the system with as few as zero modules and add or change modules over time as their needs grow or as new technologies become available.

The computing device has bays to facilitate plugging in the electronic modules. The bays provide mechanical and electrical connections between the electronic modules and one or more data busses. The computing device can include one or more processor systems coupled to the data bus or busses, input/output logic for coupling the computer user interface system to the processor system via the communication link, a data storage device such as a disk drive, and a power supply system. Some or all of these elements can be mounted with isolation mounts that protect them against harmful effects of mechanical shock and vibration.

BRIEF DESCRIPTION OF THE DRAWINGS

FIG. 3 is a perspective view of the ruggedized computing device of FIG. 2.

DETAILED DESCRIPTION

Figure 1:
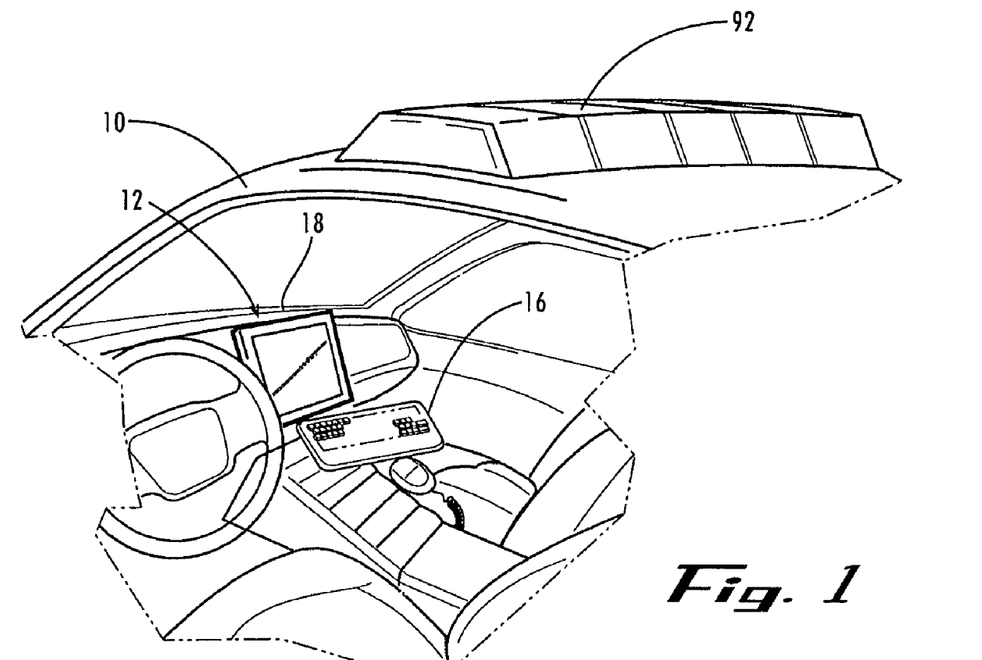
FIG. 1 is a perspective view of a cabin of a police vehicle, showing a user interface system of a mobile computing system, in accordance with an exemplary embodiment of the invention.
Figure 2:
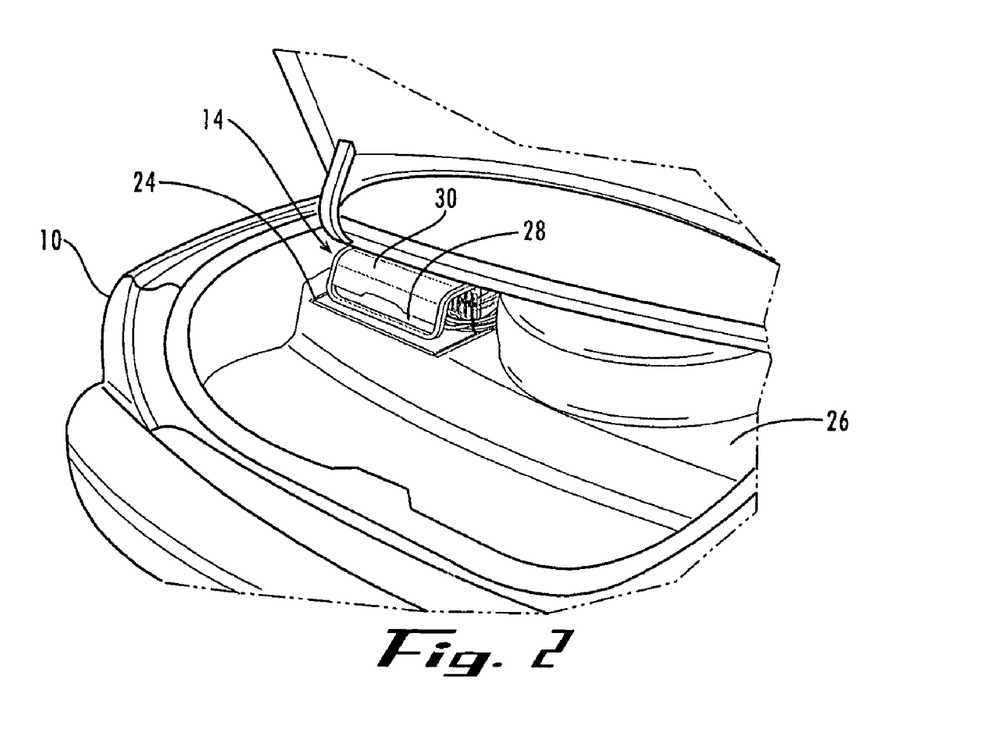
FIG. 2 is a perspective view of a trunk of the police vehicle of FIG. 1, showing the ruggedized computing device of the mobile computing system.

As illustrated in FIGS. 1-2 in an exemplary embodiment of the present invention a ruggedized mobile computing system installed in a police vehicle 10 comprises a user interface system 12 mounted in the cabin area, and a ruggedized computing device 14 mounted in the vehicle trunk. In the exemplary embodiment of the invention, ruggedized computing device 14 is coupled with user interface system 12 through suitable wires or cables, as described in further detail below, though in other embodiments the communication link between them can be wireless. In addition to the features described below for performing specialized tasks relating to the vehicle mission or purpose (e.g., police business), the system includes computer-like features that allow the driver or passenger of police vehicle 10 to use the system in much the same manner as any general-purpose personal computer. Accordingly, the user interface allows the user to provide input via a keyboard 16 (preferably having an integrated pointing device, such as a touch-pad (not shown in FIG. 1 for purposes of clarity), joystick, ball, etc.) and view output via a video display 18. Video display 18 can be a touch-screen so that a user can provide input quickly and easily. Keyboard 16 and display 18 can be of the types commonly included in laptop computers and ruggedized to withstand the rigors of police use. They can be mounted with suitable brackets (not shown) in positions conveniently accessible to the driver or passenger. Although in the exemplary embodiment of the invention the vehicle in which the system operates is a police vehicle 10, in other embodiments it can be a fire vehicle, emergency medical services vehicle, hazardous materials response vehicle, or other government or commercial vehicle that is regularly subjected to hard use or use in a harsh environment.

In other embodiments of the invention (not shown), the keyboard and other user interface elements can be stowable to keep them out of the way when not in use. In still other embodiments, a pod with input buttons, a joystick-like pointing device, trackball, or other user interface elements can be included alternatively to or in addition to a keyboard.

As illustrated in FIGS. 2-3, ruggedized computing device 14 is removably mountable in the trunk of vehicle 10 using latches 20 on the housing or enclosure 22 of device 14. Latches 20 mate with a plate 24 mountable on a surface of vehicle 10, such as the shelf 26 in the trunk on which a spare tire is often stored in some vehicle models. To provide security, plate 24 can be bolted to the surface, and latches 20 can require the use of a key (not shown) to unlatch them, and thereby release device 14, from plate 24. Although removably mounting to a plate or other mount in the trunk is preferred, in other embodiments of the invention computing device 14 can be mounted in any other suitable manner.

A downwardly curved handle 28 extends from the front of device 14. Grasping device 14 by handle 28, a person can conveniently install device 14 by sliding it into the recess of the trunk and engaging latches 20 with plate 24. Note that all or essentially all cabling connecting device 14 with vehicle systems, power, user interface system 12, or other external devices or systems, is conveniently routed from the front of device 14, thereby avoiding having to attach or remove cables on the rear of device 14 in the recess of the trunk. The front of enclosure 22 includes a curved cable guard portion 30 that protects the cables against being damaged or inadvertently unplugged. Enclosure 22 can be made of durable material such as metal or an impact-resistant plastic (e.g., polycarbonate). An enclosure 22 made of metal or including a conductive material also provides shielding against electromagnetic and radio frequency interference (commonly referred to collectively as EMI/RFI). In addition to such EMI/RFI shielding, edges of enclosure 22 where movable or removable parts, such as the top cover 32, abut one another can have EMI/RFI gasketing (not shown for purposes of clarity) to provide additional shielding.

Figure 4:
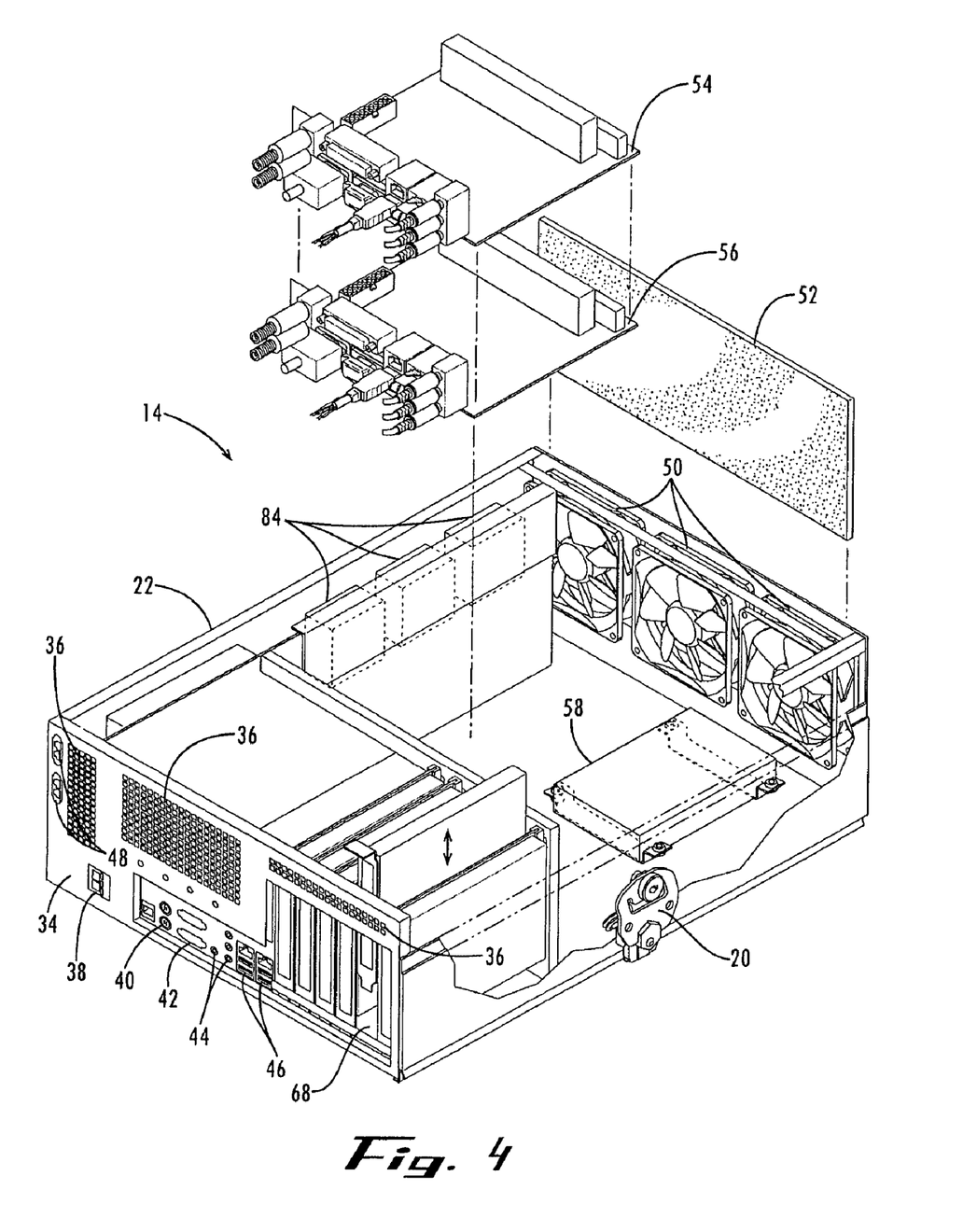
FIG. 4 is a perspective view, partially cut away and with the top portion of the enclosure removed to show the interior of the ruggedized computing device of FIGS. 2-3.
Figure 5:
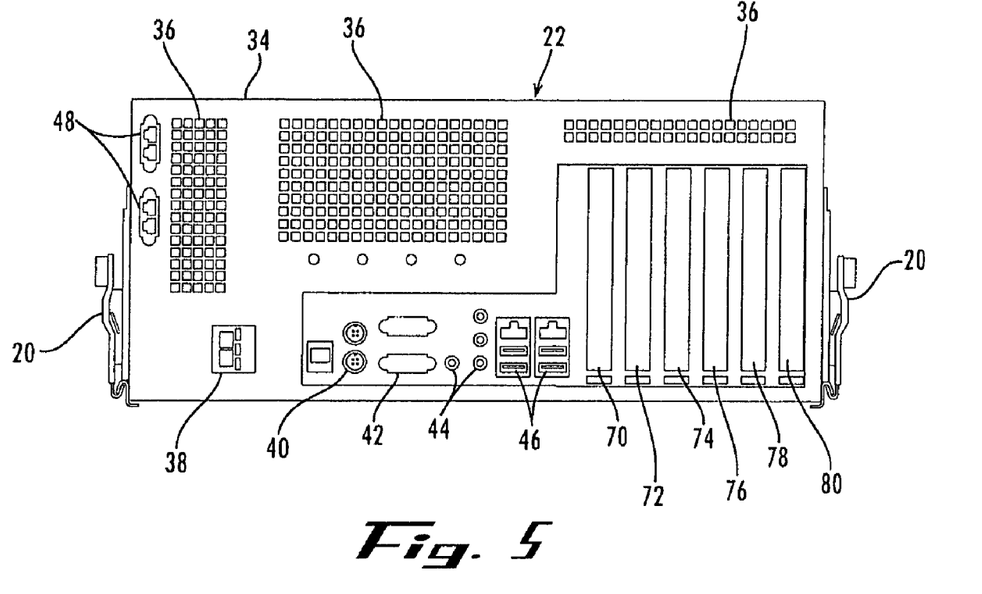
FIG. 5 is a front elevation view of the ruggedized computing device of FIGS. 2-3.

As illustrated in FIGS. 4-5, the front of enclosure 22 has a front panel 34. Grille areas 36 of panel 34 provide openings through which air can flow for cooling the interior of enclosure 22. Mounted in or on front panel 34 are various electrical cable connectors, such as power connectors 38 and 48 for connecting to 12 volt vehicle power, keyboard and mouse connectors 40, serial port connectors 42, audio connectors 44, and Ethernet and Universal Serial Bus (USB) connectors 46. The type and arrangement of these connectors is shown for purposes of illustration only, and various other connectors and arrangements will occur readily to persons skilled in the art to which the invention relates in view of the teachings in this patent specification ("herein").

With reference to FIG. 4, a number of fans 50 are mounted at the rear of enclosure 22. Although in other embodiments of the invention there can be any other suitable number and type of fans, there are preferably three or more such fans 50 in the exemplary embodiment to provide a higher than typical air flow volume for cooling and also for redundancy in case of fan failure. Fans 50 draw air into enclosure 22, which flows through enclosure 22 and is exhausted through grill areas 36. Fans 50 can be of the type referred to in the industry as a "muffin" fan, about three or four inches in diameter, conventionally used in personal computers (which typically have only one or, at most, two such fans). The continuous flow of a high air volume can provide sufficient cooling for reliable operation of the electronics of device 14 in vehicle trunks, which are known to reach temperatures over 150 degrees Fahrenheit on hot days. A strip of air filter material 52 fits within channels at the rear of enclosure 22 to filter the air drawn into enclosure 22. Device 14 also includes features, described below, to protect against adverse effects of very cold ambient temperatures as well.

The overall control logic or computing power of device 14 is provided through two motherboards or processor boards 54 and 56. (Processor boards 54 and 56 are shown in FIG. 4 in generalized form with some associated connectors for purposes of illustration; interconnecting cables or wire bundles between elements of device 14 are not shown in the figures for purposes of clarity.) Processor boards 54 and 56 can be of any suitable type known in the art. Each includes suitable processor systems comprising one or more suitable microprocessors or similar logic devices (not shown) and associated memory and other logic (not shown) of the types commonly included in personal computer motherboards or processor boards. The plural processor board feature provides redundancy to enhance reliability and other advantages, as described in co-pending U.S. patent application Ser. Nos. 11/535,810, filed Sep. 27, 2006, entitled "COMPUTING DEVICE WITH REDUNDANT, DISSIMILAR OPERATING SYSTEMS," and 11/535,803, filed Sep. 27, 2006, entitled "RAPID-BOOT COMPUTING DEVICE WITH DUAL OPERATING SYSTEMS," the specifications of which are incorporated herein in their entireties by this reference. With regard to redundancy for reliability, if one of processor boards 54 and 56 malfunctions, the other can take over control.

At least one of processor boards 54 and 56 interfaces with a disk drive 58 via standard busses in the manner known in the art. As illustrated in further detail in FIG. 7, disk drive 58 is mounted in enclosure 22 with elastomeric isolation mounts 60 that absorb shock and vibration that might adversely affect the operation of disk drive 58.

Figure 7:
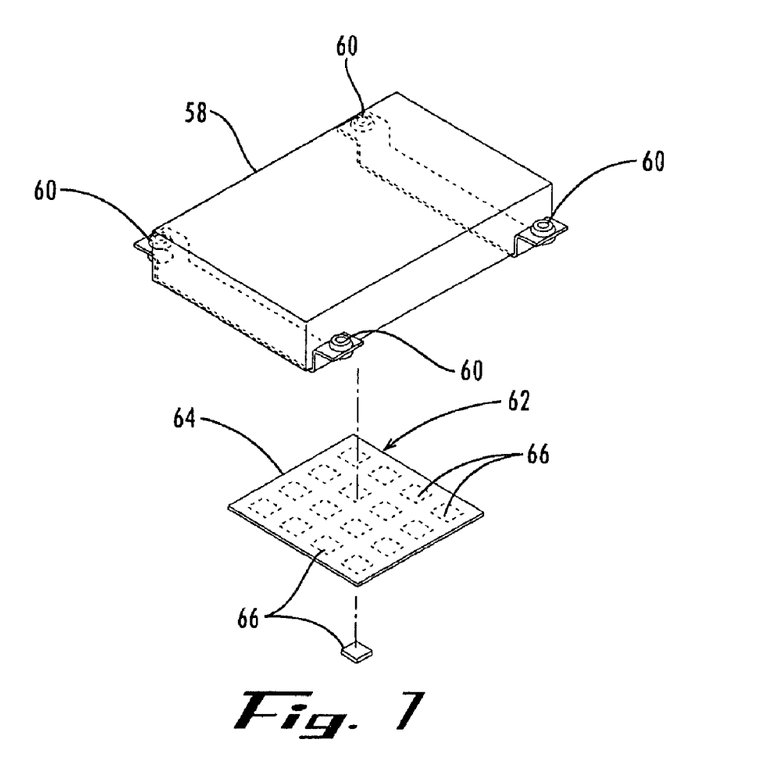
FIG. 7 is a perspective view of a hard disk drive of the ruggedized computing device of FIGS. 2-6, along with its isolation mounts and warming system.

To protect against adverse effects on disk drive 58 of very cold ambient temperatures, a warming device 62 is mounted in contact with one side of disk drive 58. Warming device 62 can comprise, for example, a card-like substrate 64 with heating elements 66 distributed on its surface. In the exemplary embodiment, heating elements 66 are common surface-mount resistors, and substrate 64 is a printed circuit board. Warming device 62 is part of a disk drive warming system that activates when the ambient temperature drops below a predetermined threshold, as described in further detail below.

Figure 6:
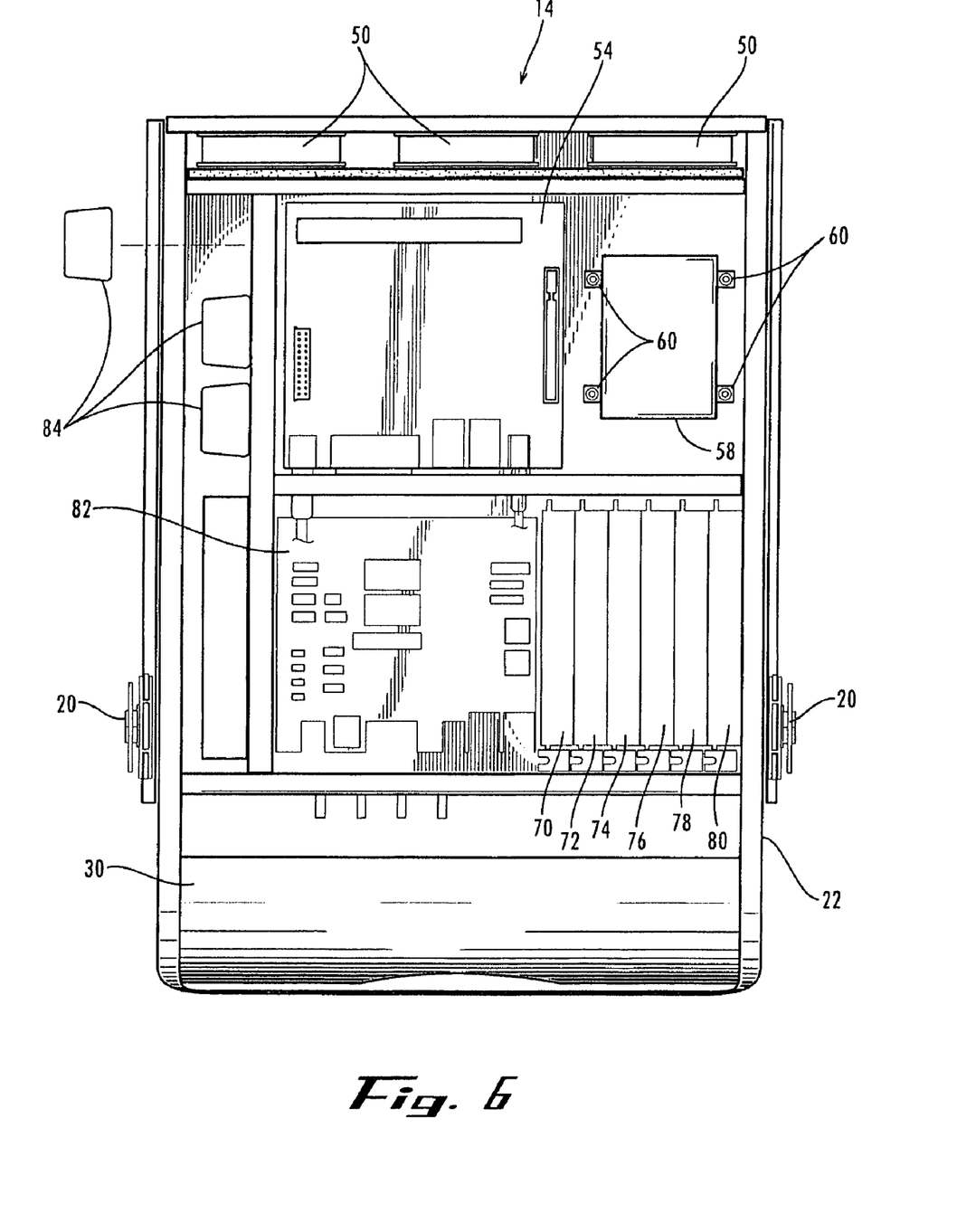
FIG. 6 is a top view of the ruggedized computing device of FIGS. 2-5, shown with the enclosure cover removed.

In accordance with another feature, as best shown in FIG. 4, the front of device 14 includes a number of module bays 68, into which a user can plug up to a corresponding number of electronic modules 70, 72, 74, 76, 78 and 80 (see FIGS. 5-6). Although in the exemplary embodiment of the invention, device 14 has six module bays 68, and six modules 70-80 are shown, in other embodiments the device can have more or fewer bays to accommodate more or fewer modules. Each module bay 68 provides mechanical and electrical connections between the modules and one or more data busses in a manner similar to that in which a conventional circuit card plugs into a motherboard slot in a personal computer or similar device. Accordingly, there are one or more electrical connectors on each module 70-80, one or more mating electrical connectors in each module bay 68, and suitable guides or rails that aid guiding modules 70-80 into module bays 68. A suitable retainer, such as a clip, latch or screw/hole can be provided on each module 70-80 or each module bay 68 to secure modules 70-80 against becoming vibrated or bumped loose or unplugged. Preferably, all of the module bays 68 have connections to two data busses, Universal Serial Bus (USB) and Ethernet, as these are currently the most common bus standards for interconnecting peripheral devices to computers. Nevertheless, in other embodiments the bus or busses can be of any other suitable type. In the exemplary embodiment, the processor systems of processor boards 54 and 56 are also coupled to these USB and Ethernet busses so that they can communicate with electronic modules 70-80. It is contemplated that electronic modules 70-80 be capable of communicating with each other directly, via the USB and Ethernet busses, without the assistance of the processor systems of processor boards 54 and 56. The busses can be provided through a suitable board 82 (FIG. 6) having electrical connectors that mate with those of electronic modules 70-80.

Device 14 also has an expandable or modular power supply that comprises a number of power supply bays into which a person can plug one or more power supply modules 84, as illustrated in FIGS. 4 and 6. From the 12 volt DC power that the power supply receives from the vehicle battery, it generates clean (filtered) and continuous power at the voltages needed to supply all of the various electronic components of device 14. It can also include a battery (not shown) to provide standby power when the vehicle is turned off, and the standby battery can be charged while the vehicle is operating.

Each power supply bay is coupled to a group of two or more module bays 68 (see FIGS. 4 and 8) to power a corresponding group of electronic modules. The interface through which the power supply bays are coupled to the module bays can comprise connectors, wires, traces on printed circuit boards, or other electrical interconnections. Thus, for example, a first one of power supply modules 84 (plugged into a first power supply bay) powers electronic modules 70 and 72; a second one of power supply modules 84 (plugged into a second power supply bay) powers electronic modules 74 and 76; and a third one of power supply modules 84 (plugged into a third power supply bay) powers electronic modules 78 and 80. The modular power supply can also include a fixed portion 86 that remains in place regardless of how many power supply modules 84 are plugged in and that is connected to the vehicle battery. Thus, as the user upgrades or expands device 14 by plugging in additional electronic modules, the user can expand the power supply correspondingly by plugging in additional power supply modules 84. By expanding the power supply only as needed, excess power supply capacity and its attendant cost, heat and weight are avoided.

Figure 8:
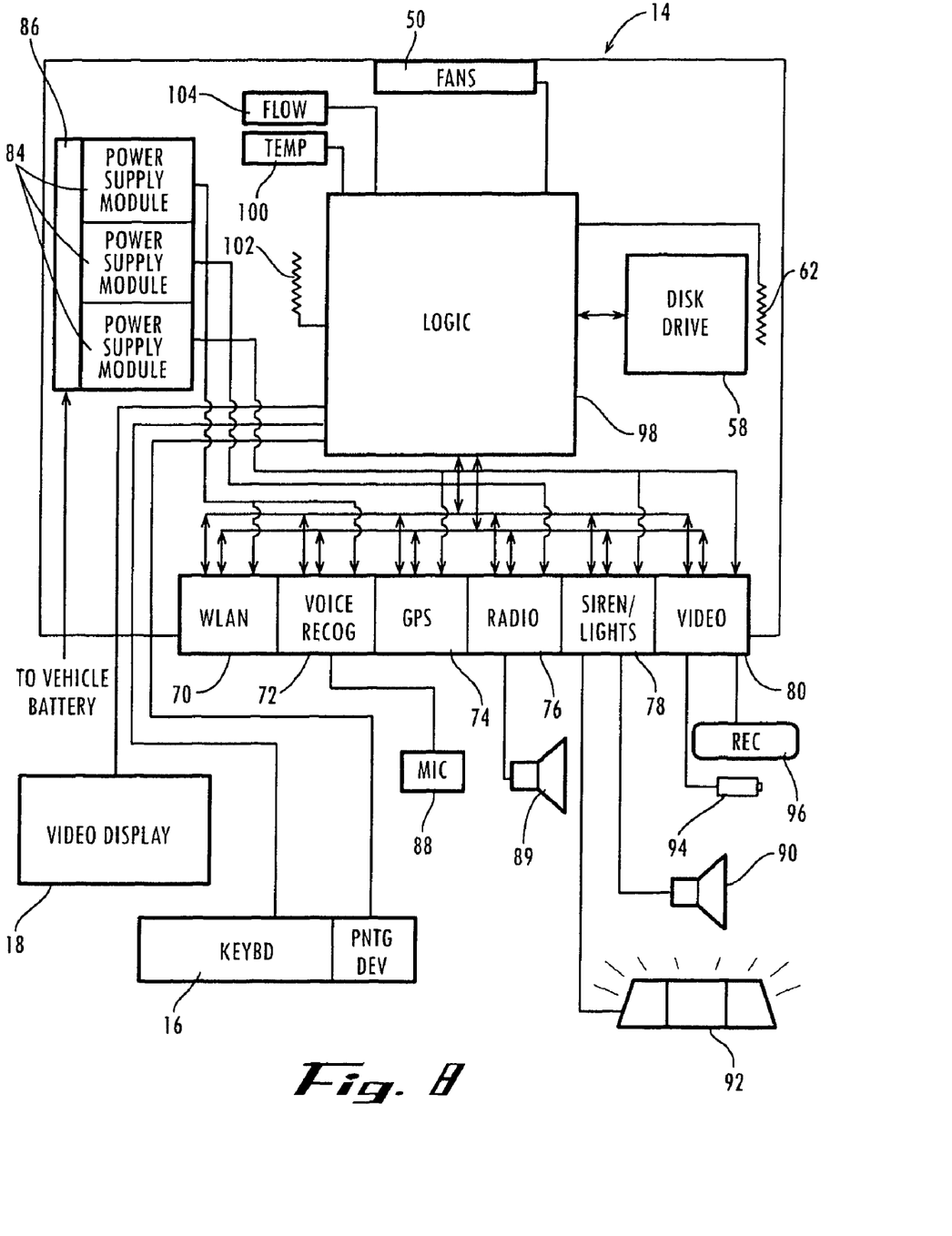
FIG. 8 is a block diagram of the electronics of the ruggedized computing device of FIGS. 2-6.

With further reference to FIG. 8, the expandability features of the present invention enable government agencies and others to conduct their emergency vehicle or commercial fleet vehicle operations economically by limiting the system to those functions that are believed at the time to be most important to the vehicle mission or purpose, and then upgrading or expanding the functionality as additional needs are identified or budget becomes available. Electronic modules relating to a host of specialized purposes relating in some way to the vehicle mission or purpose are contemplated. The following are examples that relate to police or similar emergency vehicle operations, and others will occur readily to persons skilled in the art to which the invention relates in view of the teachings herein.

Module 70 can provide a wireless local area network (WLAN) access point so that authorized users of wireless devices outside of vehicle 10 can communicate with computing device 14. For example, a police officer who has left the vehicle can be aided by a wireless device while investigating a crime scene or a driver detained for a traffic violation. The wireless device can communicate information with module 70, and device 14 can process the information (e.g., through an application program) or relay the information with a dispatcher or remote computer.

Module 72 can provide voice recognition input to device 14. Using a microphone 88 mounted in the vehicle cabin along with the other elements of user interface 12, the user can input commands or other information into device 14 by speaking them. Although not shown, module 72 can also provide a synthesized voice output to a speaker mounted in the vehicle cabin or a wireless headset so that the vehicle crew can listen to output in spoken form instead of reading it on display 18. The speaker or headset can be the same as that through which radio communications are heard.

Module 74 can provide the position or location of vehicle 10 using a global positioning satellite (GPS) system receiver. The position information can be used for many purposes, such as displaying a map with the vehicle's position on display 18. Integrated with other features, such as the WLAN of module 70, the map or position can be transmitted to a user's handheld wireless device. It is contemplated that application programs executing on the processor systems (represented in FIG. 8 along with the other electronic logic of device 14 by logic 98) can integrate the functions of the various modules that may be installed.

Module 76 can comprise a radio receiver or transceiver. The transceiver can be used for communicating with a dispatcher, for example, in the manner of a conventional police radio transceiver. Alternatively or in addition, an ordinary AM/FM radio receiver can be provided for entertainment of the vehicle crew during downtime between emergency calls. A user can select channels or otherwise interact with module 76 via user interface 12 (FIG. 1). The radio receiver can utilize any suitable frequency bands, including satellite bands. Module 76 can be coupled to a speaker 89 mounted in the cabin or to a wireless headset. Although not shown, module 76 can similarly be coupled to a microphone mounted in the vehicle cabin or a wireless headset.

Module 78 can control the vehicle siren 90 as well as the flashing beacon lights (e.g., light bar) 92 that are intended to warn of the vehicle's approach. As known in the art, conventional beacon lights on modern police cruisers can be set by the driver to operate in a variety of different modes, including coordinated flashing between the lights of the light bar on the vehicle roof or on the vehicle rear window shelf and the headlights, marker lights, etc. All vehicle lights can be connected and controlled through module 78.

Module 80 can be an audio/video system that controls a camera 94 and an audio/video recording device 96. Camera 94 can include an integrated microphone, or sound can be received via a wireless microphone carried by the police officer. In some embodiments, recording device 96 can be integrated within module 80 and include digital recording memory such as FLASH memory. Camera 94 can be mounted on or in vehicle 10 in the conventional manner and used to record traffic stops or other events in the conventional manner.

Although some of modules 70-80 or other such modules that occur to persons of skill in the art are intended to operate essentially autonomously to, for example, operate the siren and lights or provide radio entertainment when activated, others, such as module 74, can be integrated readily with software executing on the processor systems. Logic 98 represents the processor systems and other elements of processor boards 54 and 56 (FIG. 4) and all other logic involved in controlling device 14 and interfacing with external devices.

Although modules 70-80 are user-installable/removable in the illustrated embodiment of the invention, in other embodiments some of their functionality can be incorporated into logic 98. For example, board 82 (FIG. 6) can include WLAN, GPS, AM/FM radio, Bluetooth, and other hardware that is believed to be most widely applicable, i.e., desirable in the majority of embodiments, thereby saving module bays 68 for more specialized modules that may not be as widely demanded.

Logic 98 includes hardware (e.g., processors, memory, etc.), software, and other such logic to effect the computing and control functions described herein. Logic 98 can execute any suitable application programs under the control of an operating system, such as WINDOWS, LINUX, etc., in essentially the same manner as a conventional personal computer. It is contemplated that, in addition to common, commercially available application programs for word processing, communication (e.g., Web browsing, e-mail, and the like), specialized application programs can be provided (e.g., loaded onto disk drive 58) that effect specialized functions relating to the vehicle mission or purpose and that can exchange data with modules 70-80 or other such modules.

Specialized application programs or utility programs can include not only those that relate to vehicle operations but also to maintaining environmental conditions in enclosure 22. For example, suitably programmed logic 98 in conjunction with warming device 62 and a temperature sensor 100, can define a warming system for warming disk drive 58 or other portions of device 14 in very cold weather, as described above. The warming system senses ambient temperature and applies power to warming device 62 in contact with disk drive

58 if the ambient temperature is below a predetermined threshold. The warming system enables device 14 to remain-functional in sub-zero (Fahrenheit) weather, where it might otherwise be prone to failure. The warming system can similarly include a warming element 102 for warming the air passing through enclosure 22 if, for example, the ambient temperature is extremely low.

A similar environmental control function can be provided through suitably programmed logic 98 to control fans 50. Small muffin fans of the type commonly included in personal computers are prone to seizing in extremely cold ambient temperatures, and moreover, are unnecessary in such cold temperatures. Therefore, suitably programmed elements of logic 98, in conjunction with temperature sensor 100, can define a fan controller that senses ambient temperature and prevents fans 50 from operating if the ambient temperature is below a predetermined threshold.

Also, suitably programmed elements of logic 98, in conjunction with an air flow sensor 104, can indicate when air filter 52 (FIG. 4) should be replaced. If sensed air flow is below a predetermined threshold, the logic provides an indication (e.g., on display 18) that advises the user to change or clean filter 52.

As described above, the present invention provides an expandable, ruggedized mobile computing system for a motor vehicle. To install the system in accordance with the above-described exemplary embodiment, one need only mount user interface 12 in the vehicle cabin, mount computing device 14 in the trunk, couple them together via cabling or other communication link, and couple computing device 14 to vehicle power. At any time, one or more electronic modules (e.g., 70-80) can be installed. For example, device 14 can be installed initially in vehicle 10 with only one or two modules, such as module 76 for providing radio communication and module 78 for controlling a siren and lights. As only one or two electronic modules are installed, only one power supply module 84 need be installed. Vehicle 10 can then be operated as needed with only those one or two electronic modules 76 and 78. At a later time, such as when additional needs are identified or additional budget becomes available, it may be desired to add, for example, module 80 to provide a video recording function, and module 70 to provide a WLAN access point. To power four electronic modules, in the exemplary embodiment it is necessary to install another power supply module 84. In this manner, the system initially can be installed and operated very economically, and then expanded at a later time. These steps relating to installing and expanding the system are intended only to be exemplary and can be performed in any suitable order at any suitable time.

In typical use, a police vehicle 10 is likely to wear out before computing device 14. At that time, technicians can quickly and easily remove the system from one vehicle and install it in another without extensive rewiring.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A ruggedized mobile computing system for motor vehicles, comprising:
   a user interface system mountable in an area of the vehicle immediately accessible to a driver; and
   a ruggedized computing device, comprising:
      a ruggedized housing having a mounting system for removably mounting the housing in the vehicle trunk;
      processor logic;
      an interface for coupling the user interface system to the processor logic via a communication link; and
      a power supply system connectable to vehicle electrical power.

2. The ruggedized mobile computing system for motor vehicles claimed in claim 1, wherein the housing includes a latch that can be mated with a plate mountable to the vehicle.

3. The ruggedized mobile computing system for motor vehicles claimed in claim 1, wherein the latch includes a key-operated security lock.

4. The ruggedized mobile computing system for motor vehicles claimed in claim 1, wherein the housing includes a guard portion extending from a front panel to which cables are connectable for protecting cables plugged into the front panel.

5. The ruggedized mobile computing system for motor vehicles claimed in claim 4, wherein the housing includes a handle for facilitating removal from the vehicle.

6. The ruggedized mobile computing system for motor vehicles claimed in claim 1, further comprising a plurality of fans for drawing air through the housing.

7. The ruggedized mobile computing system for motor vehicles claimed in claim 6, further comprising a filter disposed over an opening in the housing through which air is drawn by the plurality of fans.

8. The ruggedized mobile computing system for motor vehicles claimed in claim 6, further comprising a filter controller for sensing air flow and generating an indication to service the filter if air flow is below a predetermined threshold.

9. The ruggedized mobile computing system for motor vehicles claimed in claim 6, further comprising a fan controller for sensing ambient temperature and preventing the plurality of fans from operating if the ambient temperature is below a predetermined threshold.

10. The ruggedized mobile computing system for motor vehicles claimed in claim 1, further comprising:
    a disk drive; and
    a plurality of isolation mounts supporting the disk drive.

11. The ruggedized mobile computing system for motor vehicles claimed in claim 1, further comprising:
    a disk drive; and
    a disk drive warming system for sensing ambient temperature and activating a warming element adjacent the disk drive if the ambient temperature is below a predetermined threshold.

12. The ruggedized mobile computing system for motor vehicles claimed in claim 1, further comprising a warming system for sensing ambient temperature and activating a warming element in the housing if the ambient temperature is below a predetermined threshold.

13. A method for providing a motor vehicle with a ruggedized mobile computing system, comprising the steps of:
    mounting a user interface system in an area of the vehicle immediately accessible to a driver; and
    mounting a ruggedized computing device in the vehicle trunk remote from the area immediately accessible to the driver, the computer device comprising:
       a housing having a mounting system for removably mounting the housing to a surface in the vehicle;
       processor logic;
       an interface for coupling the user interface system to the processor logic via a communication link; and a power supply system connectable to vehicle electrical power.

14. The method for providing a motor vehicle with a ruggedized mobile computing system claimed in claim 13, wherein the step of mounting the ruggedized computing device comprises latching the housing to a plate mounted to a surface of the vehicle.

15. The method for providing a motor vehicle with a ruggedized mobile computing system claimed in claim 13, wherein:
the step of mounting a user interface system comprises mounting a keyboard and a screen display.

16. The method for providing a motor vehicle with a ruggedized mobile computing system claimed in claim 15, wherein:
the housing includes a rear side and a front panel, the front panel has connectors for plugging in cables, and the step of mounting the ruggedized computing device comprises mounting the ruggedized computing device in an orientation in the trunk with the rear side facing a rear wall of the trunk.

17. The method for providing a motor vehicle with a ruggedized mobile computing system claimed in claim 16, wherein:
the housing includes a guard portion extending from the front panel for protecting cables plugged into the front panel.

18. The method for providing a motor vehicle with a ruggedized mobile computing system claimed in claim 15, wherein:
the housing includes a handle, and the step of mounting the ruggedized computing device comprises grasping the handle while inserting the ruggedized computing device into the vehicle trunk.

19. The method for providing a motor vehicle with a ruggedized mobile computing system claimed in claim 15, wherein:
the housing includes a rear side and a front panel, the rear side having a plurality of fans for drawing air through the housing, and the step of mounting the ruggedized computing device comprises mounting the ruggedized computing device in an orientation in the trunk with the rear side facing a rear wall of the trunk.

20. The method for providing a motor vehicle with a ruggedized mobile computing system claimed in claim 15, wherein:
a warming system senses ambient temperature and activates a warming element in the housing if the ambient temperature is below a predetermined threshold.

* * * * *